United States Patent [19]

Matias et al.

[11] Patent Number: 5,675,719
[45] Date of Patent: Oct. 7, 1997

[54] METHOD AND APPARATUS FOR PARALLEL PROCESSING OF A DOCUMENT IMAGE

[75] Inventors: Luis Ariel Matias; Raymond Edmund Maslinski, both of Rochester, N.Y.

[73] Assignee: Eastman Kodak Company, Rochester, N.Y.

[21] Appl. No.: 668,042

[22] Filed: Jun. 17, 1996

Related U.S. Application Data

[62] Division of Ser. No. 276,063, Jul. 15, 1994.

[51] Int. Cl.$^6$ .................................................. G06K 15/00
[52] U.S. Cl. .................................... 395/115; 395/116
[58] Field of Search ............................... 395/117, 114, 395/115, 112, 116, 163, 164, 165, 166, 502, 505, 506–507, 508, 510, 521, 523–525; 358/404, 444, 443, 448, 455, 426, 476; 382/305, 302, 303, 304

[56] References Cited

U.S. PATENT DOCUMENTS

| | | |
|---|---|---|
| 4,305,093 | 12/1981 | Nasu . |
| 4,564,864 | 1/1986 | Maeshima . |
| 4,884,147 | 11/1989 | Arimoto et al. . |
| 5,033,106 | 7/1991 | Kita . |
| 5,047,955 | 9/1991 | Shope et al. . |
| 5,208,676 | 5/1993 | Inui . |
| 5,218,670 | 6/1993 | Sodek, Jr. et al. . |
| 5,367,383 | 11/1994 | Godshalk et al. ............ 358/455 |
| 5,384,646 | 1/1995 | Godshalk et al. . |
| 5,436,732 | 7/1995 | Mikami . |
| 5,500,939 | 3/1996 | Kurihara . |

*Primary Examiner*—Arthur G. Evans
*Attorney, Agent, or Firm*—Milton S. Sales

[57] ABSTRACT

A reproduction apparatus such as a copier/printer includes a plurality of job image buffers (JIBs). Each JIB includes a compressor for compressing rasterized image data, a memory store for storing compressed rasterized image data and an expander for expanding the compressed rasterized image data. An electronic writer has a plurality of writing components, with each component being associated with a respective segment of an image to be simultaneously recorded. A writer interface is operatively connected to the JIBs and the writing components for simultaneously outputting to the writing components data for a respective image segment to be recorded by its respective writing component. A controller controls flow of data to the JIBs so that each of the plural JIBs receives data for only one respective segment of each page of image data. The controller determines which of the JIBs has the most available memory capacity for storing a segment of a page and directs flow of data of a segment of a page meeting a criterion as most busy to the JIB determined to have the most available memory capacity. In an alternative embodiment, the controller rotates the assignment of control segments of pages to different JIBS so that the center segments, which are likely to be the busiest segments and thus least compressible, are not assigned always to the same JIB.

7 Claims, 5 Drawing Sheets

METHOD AND APPARATUS FOR PARALLEL
PROCESSING OF A DOCUMENT IMAGE

This application is a division of application Ser. No. 08/276,063, filed 15 Jul. 1994.

FIELD OF THE INVENTION

The present invention relates to document reproduction apparatus and methods and more particularly to apparatus and methods for processing of document image data for high productivity electronic copiers and printers.

DESCRIPTION RELATIVE TO THE PRIOR ART

In the prior art of document reproduction apparatus, it is known to use non-impact recording apparatus that employ laser, light-emitting diode (LED), thermal, ink-jet or other recording sources for respectively recording images on an appropriate medium by forming picture elements or pixels. Data to be recorded may be derived from a computer, facsimile, or other source of electronic information or a document scanner that is part of an electronic copying apparatus. In the case of highly Productive reproduction apparatus, copies may be produced at over 100 copies per minute with very high image quality or resolution, say 600 dots per inch (dpi) (23.6 dots per mm). A typical production job may require multiple copies of a multipage document to be printed in collated order. As noted in U.S. Pat. No. 5,047,955, considerable time savings may ensue by rasterizing data for an image only once and printing the image plural times from a job image buffer (JIB) memory that stores the rasterized image in compressed form. Similarly, high productivity also results in printing multiple collated copies of a multi-page document without the need to rescan the image or to rerasterize electronic information.

In commonly assigned U.S. application Ser. Nos. 07/982,365 and 07/982,546, there is disclosed a reproduction apparatus having two JIB processing paths. In a high productivity mode for processing single bit rasterized binary image data, rasterized data for the next document page to be stored in the JIB memory is stored in compressed form in the JIB memory having more available memory. For a page to be printed, the data for that page is extracted from the JIB memory, expanded and further processed to be sent to the printer in proper order. However, productivity for such an apparatus is limited by the data rates of the chips used to process the data downstream of the JIB memory.

It is an object of this invention to provide a method and apparatus for increasing the productivity of electronic document reproduction apparatus. It is a further object of the invention to provide a method and apparatus for increasing the storage capacity of electronic reproduction apparatus.

SUMMARY OF THE INVENTION

These and other objects are realized in a reproduction apparatus and method, the apparatus comprising a plurality of job image buffers (JIBs), each JIB including means for compressing rasterized image data, memory means for storing compressed rasterized image data and means for expanding the compressed rasterized image data; an electronic writer means having a plurality of writing components, each component being associated with a respective segment of an image to be simultaneously recorded; writer interface means operatively connected to the JIBs and the writing components for simultaneously outputting to the writing components data for a respective image segment to be recorded by its respective writing component; and control means for controlling flow of data to the JIBs so that each of the plural JIBs receives data for only one respective segment of each page of image data.

In accordance with another aspect of the invention, there is provided a reproduction apparatus comprising a plurality of memory means for storing rasterized image data; an electronic writer means for recording an image in response to said rasterized image data; and control means for controlling flow of data to the memory means so that each of the plural memories receives data for only one respective segment of each page of image data, the control means including means for determining which of the plural memory means has the most available memory for storing a segment of a page, and wherein the control means further including means for directing the flow of data of a segment of a page meeting a criterion as most busy to the memory means determined to have the most available memory.

In accordance with still another aspect of the invention, there is provided a method of processing data for an electronic writer, the method comprising controlling flow of data to each of plural memories so that each of the plural memories receives data for a respective segment of each page of image data; determining which of the memories has the most available memory for storing a segment of a page; and directing the flow of data of a segment of a page meeting a criterion as most busy to the memory determined to have the most available memory.

In yet still another aspect of the invention, there is provided a method of processing data for an electronic writer, the method comprising controlling flow of data to each of three memories so that each of the three memories is the only one assigned to receive image data from a center segment of the first page; for a second page, a second of the three memories is the only one assigned to receive image data from a center of the second page; and for a third page, a third one of the three memories is the only one assigned to receive image data from a center of the third page.

DESCRIPTION OF THE PREFERRED EMBODIMENTS

The apparatus of the preferred embodiment will be described in accordance with an electrostatographic recording medium. The invention, however, is not limited to apparatus for creating images on such a medium, as other media such as photographic film etc. may also be used within the spirit of the invention, as well as other recording modes, i.e., ink jet, thermal, electrographic, etc.

Because electrostatographic reproduction apparatus are well known, the present description will be directed in particular to elements forming part of or cooperating more directly with the present invention. Apparatus not specifically shown or described herein are selectable from those known in the prior art.

Figure 1:
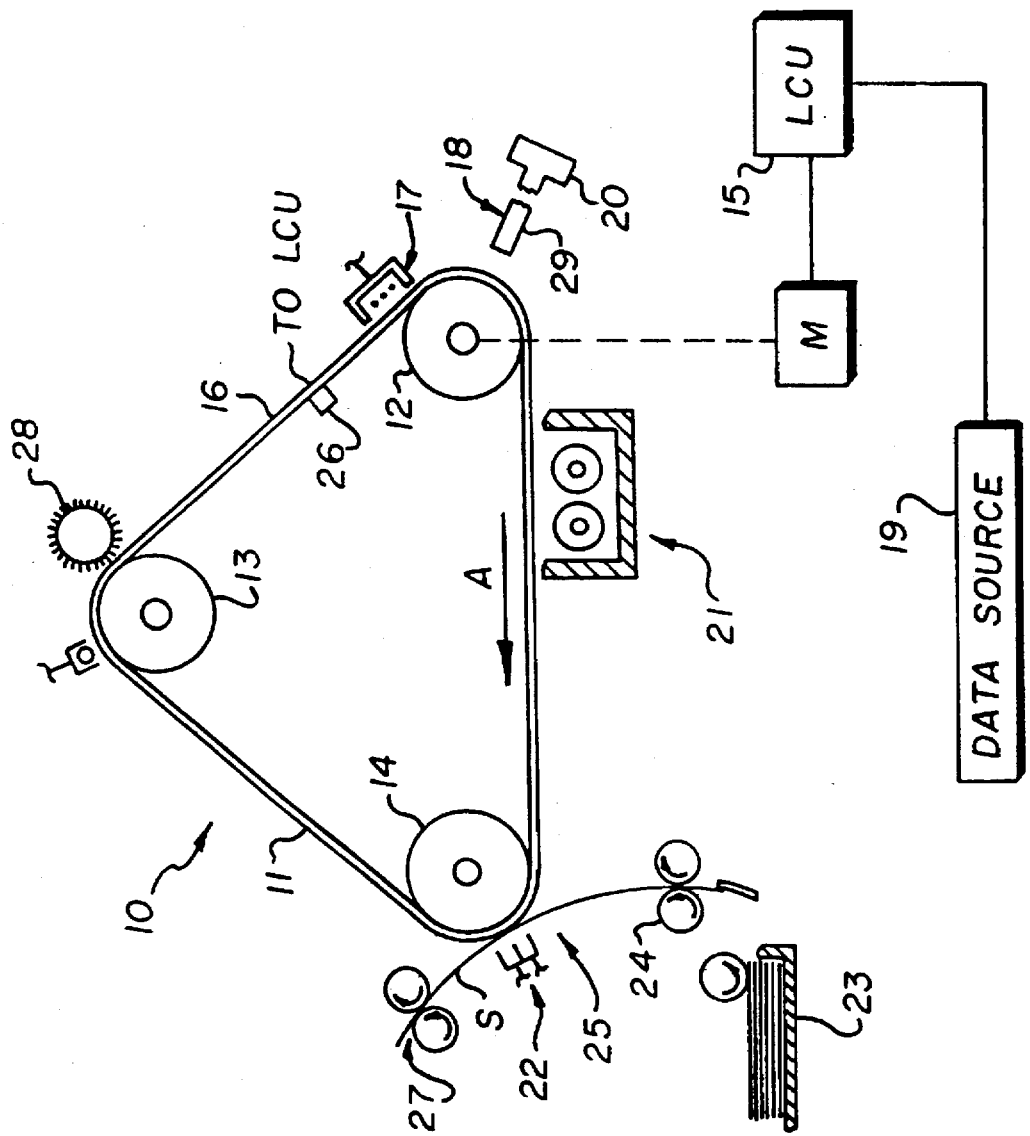
FIG. 1 is a schematic of a document reproduction apparatus of the prior art.

With reference now to FIG. 1, an electrostatographic reproduction apparatus 10 includes a recording medium such as a photoconductive web if or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a signal from a logic and control unit (LCU) 15. When the switch is closed, the roller 12 is driven by the motor M and moves the web 11 in a clockwise direction as indicated by arrow A. This movement causes successive image areas of web 11 to sequentially pass a series of electrophotographic work stations of the reproduction apparatus.

For the purposes of the instant disclosure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by an image data source 19 such as a document image scanner, computer work station, word processor, and the like. The print jobs may be queued in a print server, and spooled one page at a time to a raster image processor (RIP). The point-like radiation sources are supported in a print head 20 to be described in more detail below.

A development station 21 includes developer which may consist of iron carrier particles and electroscopic toner particles with an electrostatic charge suited for developing the latent electrostatic image, as is well known. Developer is brushed over the photoconductive surface 16 of the web 11 and toner particles adhere to the latent electrostatic image to form a visible toner particle, transferable image. The development station may be of the magnetic brush type with one or two rollers.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable encoder means 26 for sensing web perforations. This sensing produces input signals into the workstation LCU 15 which has a digital computer, preferably a microprocessor. The microprocessor has a stored program responsive to the input signals for sequentially actuating, then de-actuating the work stations as well as for controlling the operation of many other machine functions. Additional or other encoding means may be provided as known in the art for providing the precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 3:
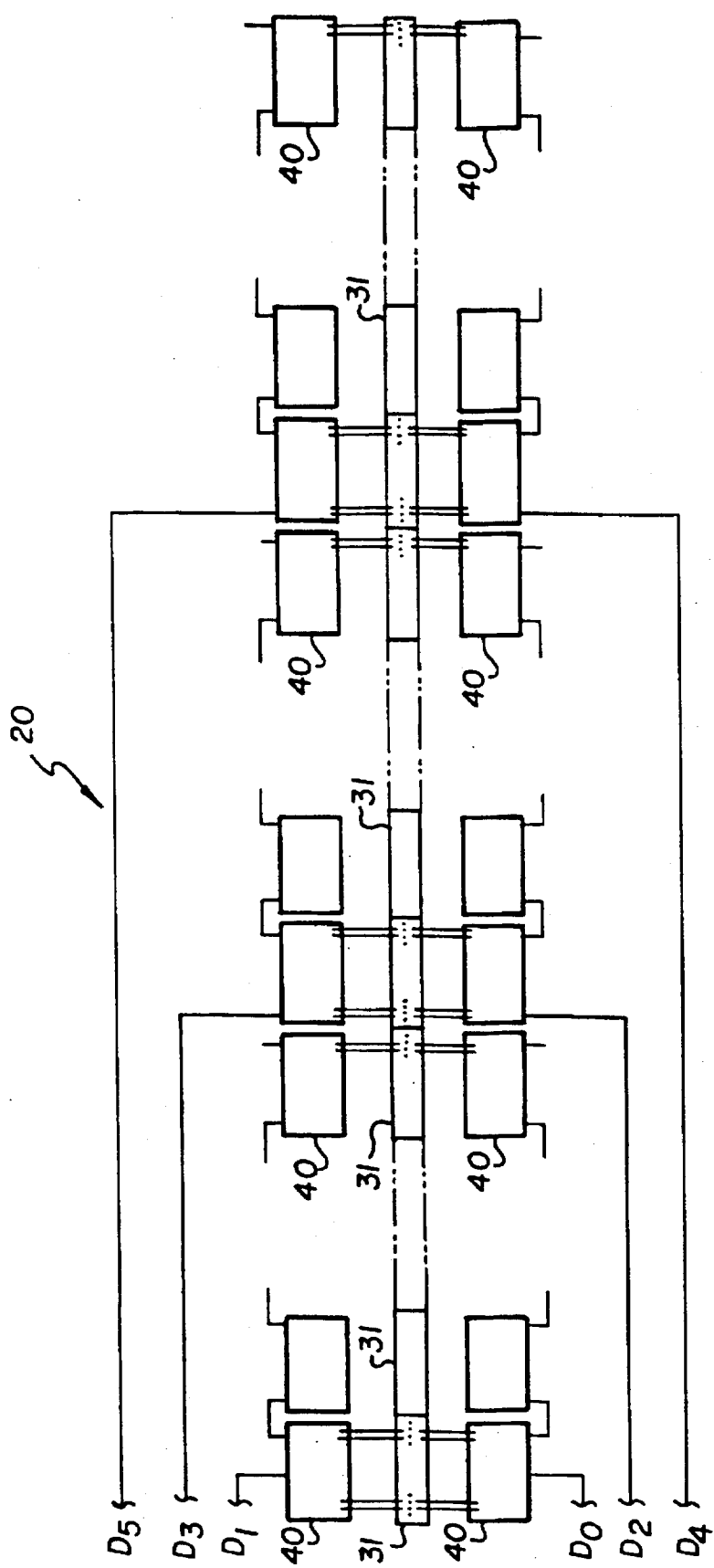
FIG. 3 is a schematic of an LED printhead forming part of the apparatus of FIG. 2.

With reference to FIGS. 1 and 3, the printhead 20, as noted, is provided with a multiplicity of energizable point-like radiation sources, preferably light-emitting diodes (LEDs) arranged in a row although other recording devices such as thermal devices, liquid crystal display elements or needle electrodes are also contemplated. Optical means 29 may be provided for focusing light from each of the LEDs onto the photoconductive surface. The optical means preferably comprises an array of optical fibers such as sold under the name SELFOC, a trademark for a gradient index lens array sold by Nippon Sheet Glass, Limited. Due to the focusing power of the optical means 29, a row of emitters will be imaged on a respective transverse line on the recording medium.

With reference to FIG. 3, the print head 20 comprises a suitable support with a series of LED chips 31 mounted thereon to form an array of several thousand LEDs arranged in a single row. Assume for purposes of facilitating discussion that each of the chips 31 includes in this example 100 LEDs arranged in a single row with their respective centers spaced so as to provide a uniform pitch of 600 dpi. Chips 31 are also arranged end-to-end in a row and where ninety LED chips are so arranged, the print head will extend across the width of the web 11 and include 9000 LEDs arranged in a single row. To each side of this row of LEDs there are provided in this example ninety identical driver chips 40. Each of these driver chips include circuitry for addressing the logic associated with each of 50 LEDs to control whether or not an LED should be energized or activated. Two driver chips 40 are thus associated with each chip of 100 LEDs. Each of the two driver chips will be coupled for driving of alternate LEDs. Thus, one driver chip will drive the odd numbered LEDs of the 100 LEDs and the other will drive the even numbered LEDs of these 100 LEDs. The driver chips 40 are electrically connected, as is well known, in parallel to a plurality of lines providing various electrical control signals and potentials. A plurality of lines (not shown) provide electrical energy and ground for operating the various logic devices and current drivers in accordance with their voltage requirements and also provide clock signals and other pulses for controlling the movement of data to the LEDs in accordance with known techniques.

As shown in FIG. 3, odd and even data lines $D_{0-5}$ are provided to the printhead. To speed data to the printhead, the printhead data flow is divided so that data line $D_o$ provides serially data for even-numbered LEDs for a first third of the printhead; data line $D_2$ provides serially data for even-numbered LEDs for a second or middle third of the printhead and data line; data line $D_4$ provides serially data for even-numbered LEDs for a third third of the printhead.

Similarly, data line D1 provides serially data for odd-numbered LEDs for a first third of a printhead; data line $D_3$ provides serially data for odd-numbered LEDs for a second or middle third of the printhead and data line $D_5$ provides serially data for odd-numbered LEDs for a third third of the printhead. The serial data provided is single bit per pixel data. Thus, for example, the data flow to the driver chips 40 constituting the first third of the printhead are provided in a serial data stream of binary bits say for LEDs 0, 2, 4, 6 . . . 2998. The data is input serially to the first driver chip under clock control. Each driver chip includes a shift register and the shift registers of the driver chips in the first third of the printhead on the even side are effectively connected to function as a single shift register so as to allow data to stream through the register until filled with 1500 bits of data. The structure and operation of the other 5 segments of the printhead are similar.

Figure 2:
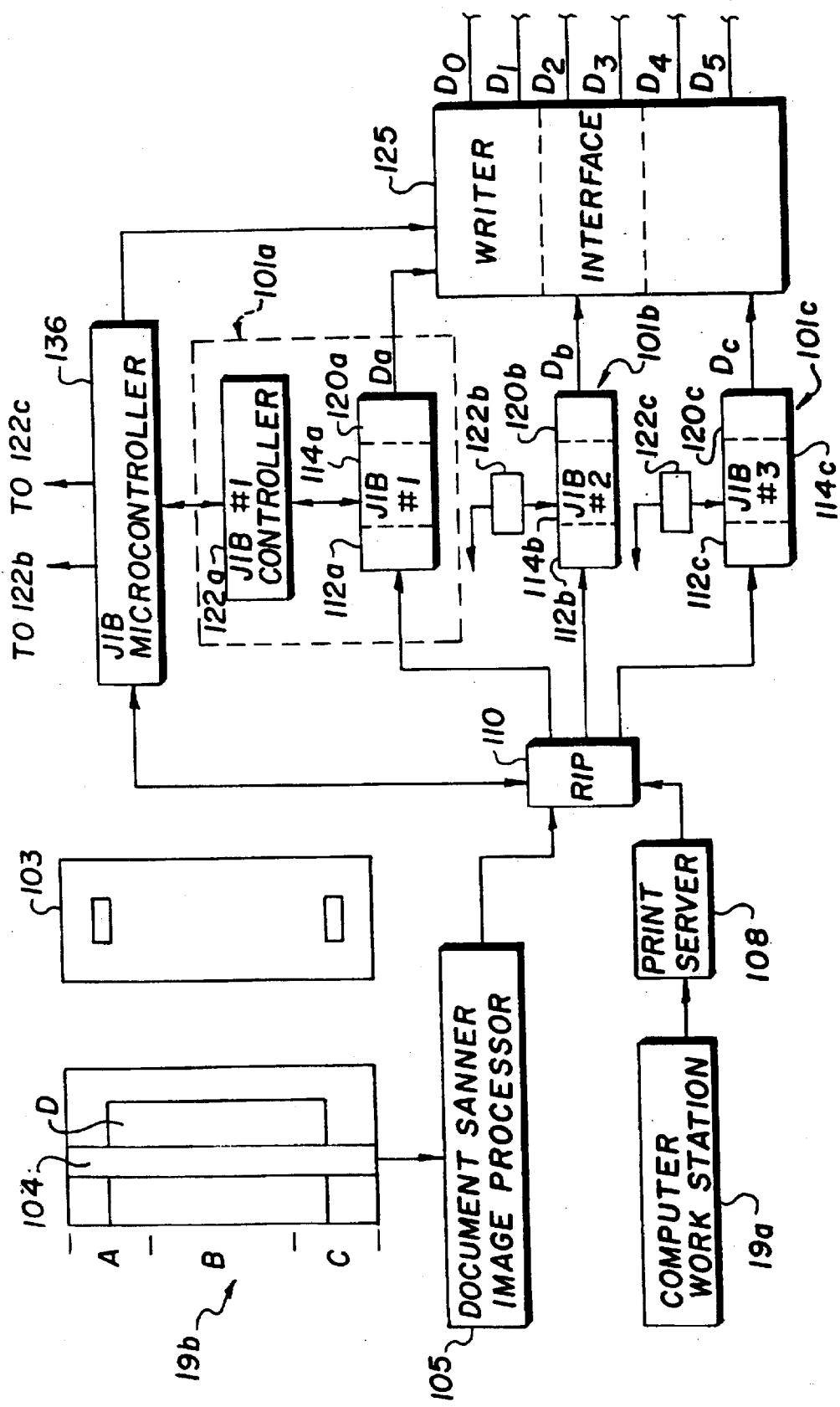
FIG. 2 is a schematic of a portion of a document reproduction apparatus of the invention which may be used to increase the productivity of the apparatus of FIG. 1.

With reference now to FIG. 2, a printer control system 100 is shown. The printer control system 100 is operable in conjunction with or disposed within the LCU 15 of the reproduction apparatus 10 as described previously with respect to FIG. 1. The printer control system 100 is therefore interconnected with the image source 19 and the print head 20. General motor control and control of other workstation functions as previously described with respect to the LCU 15 are thus unchanged.

In FIG. 2, elements comprising a job image buffer or JIB 101a, 101b, 101c are described in more detail in U.S. Pat. No. 5,047,955, the contents of which are incorporated herein by reference. Image data source 19 produces print jobs as either character code signals and/or pictorial-signals from an image source 19a such as a computer work station, disk drive or facsimile. Data source 19 also includes an alternate source of image data comprising a document scanner and image processor 19b. As shown, document scanner and image processor 19b may include a document supporting platen 102 wherein a feeder including feed rollers or other suitable feeding members feeds documents to a platen seriatim for scanning by the scanner. In a preferred embodiment, the scanner scans document pages D as the pages are serially moved from a document supply or positioner bin 103 to beneath the scanner 104 and then to an exit bin or storage area for receiving scanned documents. Suitable drive means are provided for advancing the document pages seriatim through the scanner. Alternatively, scanning may be made by the scanner moving across stationary document pages supported on a platen associated with the scanner. A document scanner image processor 105 converts signals generated by the scanner 104 which may be a CCD device, and converts same to rasterized binary or single-bit digital signals using known thresholding algorithms. The processor may include a one-page buffer for storing the rasterized binary signals. The rasterized digital signals thus represent data from a set of document sheets to be copied and which have been scanned by the scanner.

Print jobs from computer work station 19a are queued in a print server 108, and spooled one page at a time to a raster image processor (RIP) 110. The RIP converts the code signals input thereto to a rasterized video data stream for printing pixel by pixel as described herein. Data signals from the document scanner image processor 105 also comprise a similar rasterized video data stream for printing pixel by pixel as also described herein. The data output from either the RIP or the document scanner image processor 105, which either passes nominally directly through the RIP or may bypass the RIP is a 1-bit per pixel binary weighted digital signal representing a print or no-print decision for each pixel to be recorded. As the three JIBs 101a, b, and c are substantially similar, description will now be made of JIB 101a, it being understood that such description will also apply to JIBs 101b and 101c.

The JIB 101a for the image frame being processed receives the single bit per pixel image data stream from the RIP 110 or document scanner image processor 105. The JIB 101a includes a data compressor 112a, which is preferably a hardware implementation of an appropriate algorithm which encodes redundant information into a more compact form before passing the compressed data stream to a multi-page image buffer memory 114a, also part of the JIB. Data compression algorithms are well known to those skilled in the art and a particular algorithm may be selected from various known algorithms. One known algorithm for example is CCITT Group IV. Data compressor 112a includes a data stream compression driver and a line store for buffering a full line's worth of data.

An expander 120a is the companion to data compressor 112a, and it includes a data expansion processor and a line store. The expander retrieves the compressed data stream from multi-page image buffer memory 114a and reconstructs the output data into approximately original form as input to the data compressor 112a. The data stream $D_a$ is transmitted to a data resequencing circuit that is part of a writer interface 125 as sixteen-bit data words on a parallel data link. The resequencing circuit is comprised of resequencing line store devices and is simultaneously adapted to provide serial feed of data onto respective even and odd data lines of $D_o$, $D_1$ for the LEDs on the first third of the printhead. Similarly, JIB #2 or 101b outputs expanded data $D_b$ and this is resequenced by writer interface 125 to respective even and odd data lines $D_2$, $D_3$ on the middle third of the printhead. JIB #3 or 101c outputs expanded data $D_c$ and this is resequenced by writer interface 125 to respective even and odd data lines $D_4$, $D_5$ on a third third of the printhead.

Multi-page image buffer memory 114a is provided for storing image data to permit the electronic recirculation of images for collation; thereby eliminating the need for a mechanical recirculating document handler. The heart of the JIB's image buffer memory 114a is a large bank of dynamic random access memory (DRAM) for storage of the image data as it is processed by data compressor 112a. Alternatively, a disk may comprise the memory in the buffer or other mass storage devices may be used.

A controller 122a is associated with JIB #1 and acts as a direct memory access controller, allowing data compressor 112a and expander 120a direct access to the DRAM buffer without a microprocessor, and as a DRAM controller arbitrating between memory read, write, and refresh cycles. Additional controllers 122b, 122c similar to controller 122a, are associated with JIBS #2 and #3, respectively.

A microcontroller 136 functions as the system manager, overseeing the overall operation of the JIBS 161a, 101b and 101c. The microcontroller will handle communication with the microprocessor of the logic and control unit (LCU) 15 of the marking engine, store the internal pointers identifying, for example, the beginning and ending addresses for each image frame as well as each segment of an image frame, initiate transfers from the RIP 110 or document scanner image processor 105, and control the data compression and expansion process.

The writer interface 125 receives a full line of image data from the expanders 120a, 120b and 120c.

Figure 4:
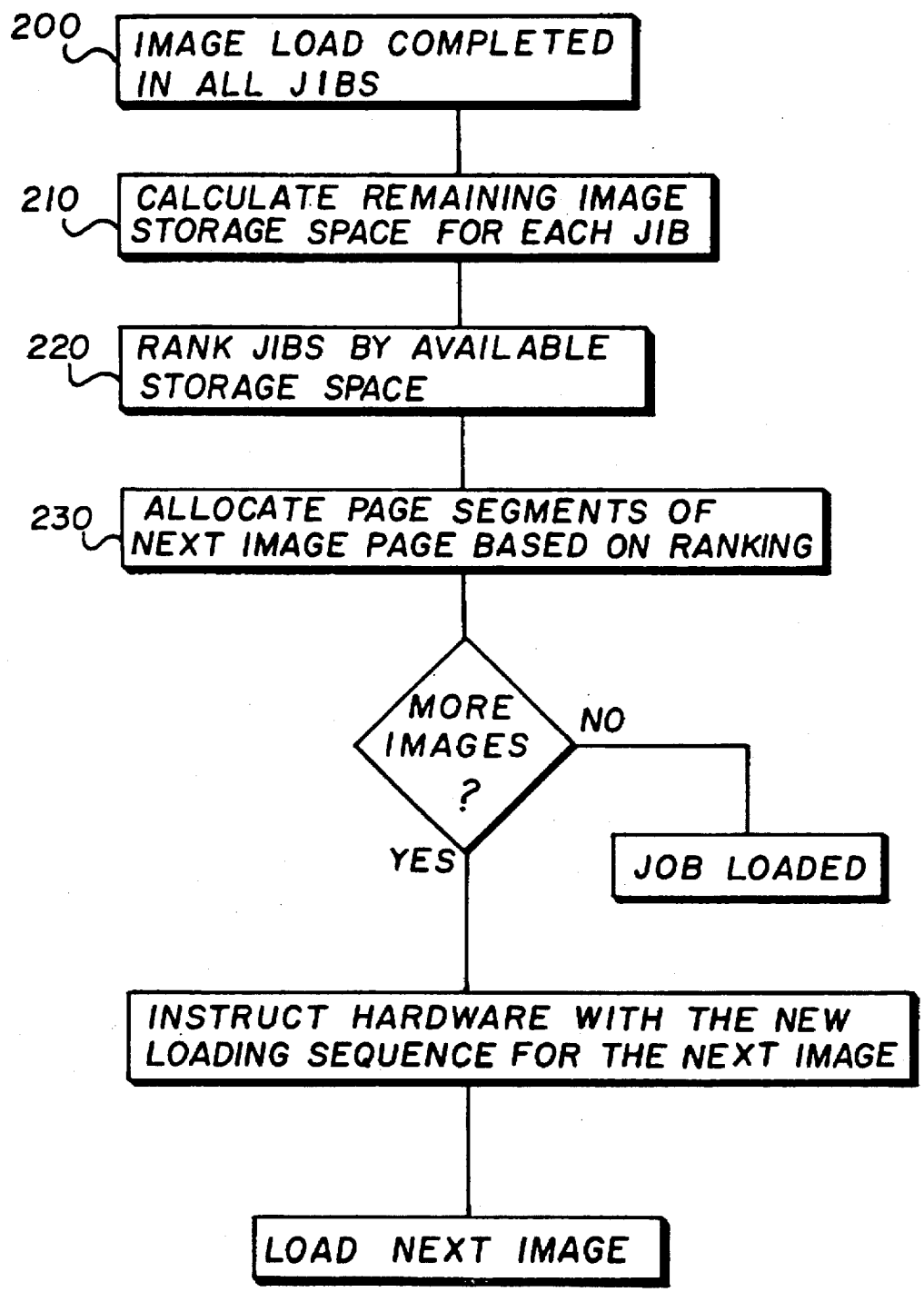
FIG. 4 is a flowchart illustrating operation of one embodiment of a method and apparatus of the invention.

In accordance with the invention and with reference to the flowchart of FIG. 4, the JIB microcontroller 136 is programmed after each image, i.e. a full image frame of rasterized data, is loaded into the three JIBs, step 200, to calculate the remaining image storage space in each of JIBs 101a, 101b, and 101c (step 210). In the next step (220), the JIBs are ranked in accordance with available storage space. The JIB having the most remaining storage space is then determined to be the JIB that will receive the image data from the middle segment B of the next image. As may be noted in FIG. 2, the document D is a center registered document as it is being scanned. Assuming an 8½"×11" document as typical and a photoconductor that is at least 14" wide it will be apparent that the center segment B will be the busiest of the three segments from the standpoint of the compressor. The compressor cannot compress relatively busy data; i.e. frequent changes from binary 1's to 0's or vice versa, as well as it can compress long strings of 1's or 0's. For a centered registered document of 11" dimension on a 14" platen, it can be assumed that segments A and C will be less busy than segment B because of white areas above and below the document D. It also may be assumed that, on average, segment A will be busier than segment C since top segments of documents intuitively tend to be busier than the bottom segments. Alternatively, no ranking distinction need be made between segments B and C. In any event, the decision in step 230 determines which JIB will receive the center segment B of the next image based on the ranking established in 220. That is, the JIB with the most available memory receives the data from the center segment B of the next image. The two other JIBs then are allocated page segments A and C based on ranking or random selection.

The image data for the assigned segments are simultaneously loaded into the respective JIBs 101a, 101b, 101c to provide for high productivity of processing. The microcontroller 136 keeps track of the beginning and ending addresses for each segment in each JIB. Each JIB controller 122a, 122b and 122c provides data to microcontroller 136 of the remaining memory in the respective JIB buffer memory after the respective image segment is loaded in each JIB buffer memory. The process then repeats to rank the JIBs and select which JIB receives the data for the middle segment of the next image and which JIBs receive the data for the other segments of data for the next document sheet output by the RIP. Alternatively, the JIB microcontroller 136 may keep track directly of the remaining memory in the buffers or this function could be assigned to an application specific integrated circuit (ASIC).

Figure 5:
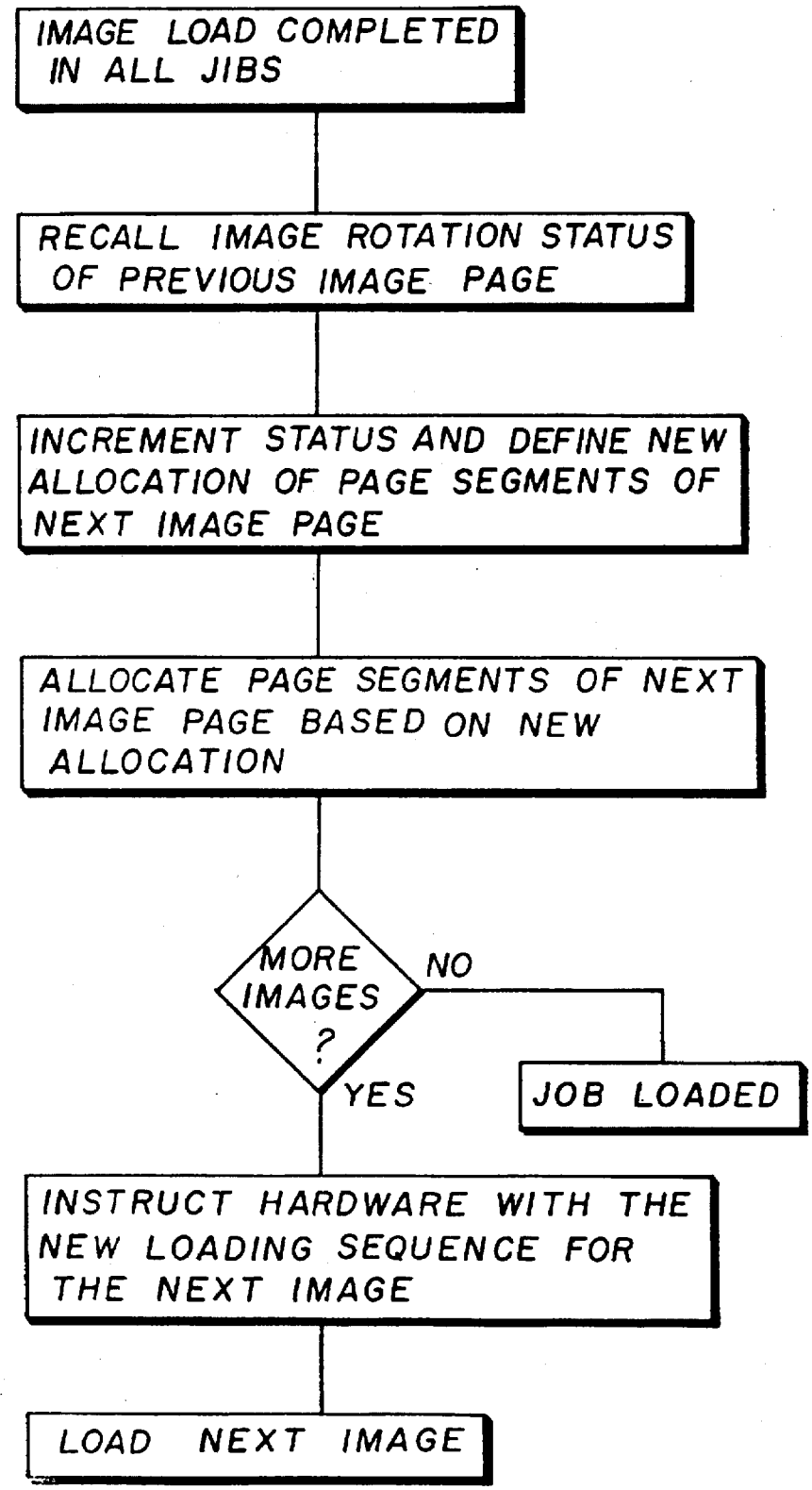
FIG. 5 is a flowchart illustration operation of a second embodiment of a method and apparatus of the invention.

In lieu of keeping track of which JIB has the most available storage space the invention in its broader context may have operation of the data flow such that the JIBs merely rotate as to which JIBs receive which image segments. For example, and with reference to the flowchart of FIG. 5, the first image could have for a first rotation image status X=N, wherein Segment A is assigned to →JIB #1, Segment B is assigned to →JIB #2, Segment C is assigned to →JIB #3. For the second rotation image status, Y=N+1, the assignment might be: Segment A →JIB #2, Segment B →JIB #3 and Segment C→JIB #1. The third image rotation status Z=N+2 would have the assignment of: Segment A →JIB #3, Segment B →JIB #1, Segment C →JIB #2. The fourth image would then repeat the assignments for the first image rotation status and so on in what may be referred to as a blind rotation scheme; i.e. wherein there is no ranking of which buffer has the most available memory but the process assumes that the segment that tends to be busiest will be handled alternately by the JIBs.

Although the invention has been described with reference to dividing an image into three segments, it will be appreciated that the invention in its broader aspects covers the separate processing of an image frame of data into two or more JIB processing paths. Where only two JIB processing paths are provided and say the document D is registered on the platen (or registered relative to one longitudinal end of the scanner) along its top edge, e.g., a corner registered document, than it may be assumed that the top half segment is busiest since there will be more white area in the bottom half of the scanner since the scanner is typically dimensioned to be longer than the length of the average size sheet being processed. Also, in lieu of an intuitive approach where it is assumed that the center is the busiest for three processing paths using three JIBs as described above, a statistical analysis may be made as to which of the segments is the busiest and base assignment of segments to JIBs accordingly. This distribution may be taken over say 10,000 documents and the determination of likely busiest segment made according to this analysis without further checking as to whether or not this assessment continues to hold true for any particular document set. On the other hand, the RIP can be programmed to keep track of busyness of image segments for the last say 10 images and do an on-the-fly reassessment for defining what is the likely busiest segment for the next image coming from the RIP. Still other modifications are considered a part of the broader aspects of our invention including real time assessment of the current image and allocation of JIBs accordingly.

As used herein, pixels associated with a document refer, not necessarily to all pixels on a document original or a printed copy thereof, but to all pixels that are to be printed on a single image frame of the printer apparatus. Thus, where a printed document is to be produced and wherein the sheet includes different colors, the printer apparatus could record portions of the image on different image frames and develop such image frames, respectively, with differently colored toners and transfer the two or more developed images in register to a receiver sheet to form a composite plural color image. Alternatively, printer apparatus are known for printing color copies wherein one image frame is used for printing plural colors. The invention contemplates that all pixels associated with one color of an image frame may be divided into "page segments" as described herein and processed in accordance with the teachings herein as a page.

In still another alternative, single bit or binary data relating to an image pixel may be expanded by correction means associated with the printhead to correct for nonuniformities in light emissions of the LEDs by adjusting pulsewidth on-times of the LEDs or intensity of light outputs via current level adjustments as is well known.

Although the invention and its preferred embodiments are disclosed with reference to binary printing of pixels, the invention in its broader aspects contemplates grey level pixel image data being segmented in accordance with the teachings herein.

Although the JIBs are preferably used to store rasterized data in compressed form, the invention contemplates that the rasterized data may be stored uncompressed.

As noted in the above specific example where three JIBS are provided, the writer is conveniently divided into three components or writing segments each associated with a respective JIB. Similarly, where two JIBS are provided, the writer is conveniently divided into two components or writing segments. Alternatively, the number of writer components may differ from the number of JIBS with the writer interface used to suitably stitch or process the data from the JIBS so that it is sent in suitable order to the writer.

There thus has been described an improved apparatus and method for processing of rasterized image data at high speed wherein plural JIBs are used to process data relating to the same image frame simultaneously and wherein image storage capacity is enhanced by allocation of different segments to the various JIBs based on available memory.

The invention has been described in detail with particular reference to preferred embodiments thereof, but it will be understood that variations and modifications can be effected within the spirit and scope of the invention.

What is claimed is:

1. A reproduction apparatus comprising:

a plurality of job image buffers (JIBs), each JIB including means for compressing rasterized image data, memory means for storing compressed rasterized image data and means for expanding the compressed rasterized image data;

an electronic writer means;

writer interface means operatively connected to the JIBs and the electronic writer means; and control means for controlling flow of data to the JIBs so that each of the plural JIBs receives data for only one respective segment of each page of image data and the control means controls flow of data to the JIBs so that each JIB memory means stores image data of segments of plural pages and the control means assigns segments of a page to the JIBs in accordance with a predetermined algorithm of rotating assignments.

2. The apparatus of claim 1 and wherein there are three JIBs and the reproduction apparatus includes a document page scanner for scanning a center registered document page.

3. The apparatus of claim 1 wherein there are two JIBS and the reproduction apparatus includes a document page scanner for scanning a top edge registered document page.

4. The apparatus of claim 1 and wherein the control means controls flow of data to the JIBs so that data from different segments of a page flow simultaneously to the JIBs.

5. A method for reproduction of documents comprising:

simultaneously processing plural different segments of a page of rasterized image data so as to separately compress the rasterized image data of respective segments, store in separate memories the compressed rasterized image data of the respective segments and expand the compressed rasterized image data of the respective segments;

outputting expanded data to an electronic writer; and controlling flow of data to the separate memories so that each of the memories receives data for only one respective segment of each page of image data and the segments of a page to the memories are assigned in accordance with a predetermined algorithm of rotating assignments and wherein each memory stores image data of segments of plural pages.

6. The method of claim 5 and wherein there are three memories for storing compressed image data of a document page that is scanned as a center registered document page.

7. The method of claim 5 and wherein there are two memories for storing compressed image data of a document page that is scanned as a top edge registered document page.

* * * * *